(12) United States Patent
Junqua

(10) Patent No.: US 6,253,181 B1
(45) Date of Patent: Jun. 26, 2001

(54) SPEECH RECOGNITION AND TEACHING APPARATUS ABLE TO RAPIDLY ADAPT TO DIFFICULT SPEECH OF CHILDREN AND FOREIGN SPEAKERS

(75) Inventor: Jean-Claude Junqua, Santa Barbara, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/235,181

(22) Filed: Jan. 22, 1999

(51) Int. Cl.[7] .................................................. G10L 15/06
(52) U.S. Cl. ........................... 704/255; 704/236; 704/244
(58) Field of Search .................................. 704/244, 255, 704/236, 245, 243

(56) References Cited

U.S. PATENT DOCUMENTS

| 5,278,942 | * | 1/1994 | Bahl et al. ........................... 704/200 |
| 5,548,647 | * | 8/1996 | Naik et al. ........................... 704/200 |
| 5,717,828 | | 2/1998 | Rothenberg ....................... 704/270.1 |
| 5,787,394 | | 7/1998 | Bahl et al. ........................... 704/238 |

FOREIGN PATENT DOCUMENTS

| 0953968 A2 | 4/1999 | (EP) .................................... 704/255 |
| 1022722 A2 | 7/2000 | (EP) .................................... 704/255 |

OTHER PUBLICATIONS

Homma, Shigeru, Kiyoaki Aikawa, and Shigeki Sagayama, "Improved Estimation of Supervision in Unsupervised Speaker Adaptation," 1997 IEEE Int. Conf. Acoust, Speech, and Sig. Proc. 1997 ICASSP–97, Apr. 21–24 1997, vol. 2, pp. 1023–1026.*

Eigenfaces and Eigenvoices: Dimensionality Reduction for Specialized Pattern Recognition; Kuhn et al.; Article No. XP–000908921; 6 pages.

Eigenvoices for Speaker Adaptation; Kuhn et al.; Article No. 000910944; 4 pages.

* cited by examiner

Primary Examiner—William R. Korzuch
Assistant Examiner—Donald L. Storm
(74) Attorney, Agent, or Firm—Harness, Dickey & Pierce, P.L.C.

(57) ABSTRACT

The recognizer tests input utterances using a confidence measure to select words of high recognition confidence for use in the adaptation process. Adaptation is performed rapidly using a priori knowledge of about the class of speakers who will be using the system. This a priori knowledge can be expressed using eigenvoice basis vectors that capture information about the entire targeted user population. The dialogue system may also use the confidence measure to output a pronunciation example to the user, based on the confidence that the system has in the results of recognition, given the different possibilities that can be recognized. The dialogue system may also provide voiced prompts that teach the user how to correctly pronounce words.

6 Claims, 4 Drawing Sheets

SPEECH RECOGNITION AND TEACHING APPARATUS ABLE TO RAPIDLY ADAPT TO DIFFICULT SPEECH OF CHILDREN AND FOREIGN SPEAKERS

BACKGROUND AND SUMMARY OF THE INVENTION

The present invention relates generally to speech recognition systems and speech training systems. More particularly, the invention relates to a speech recognition apparatus having an adaptation system employing eigenvoice basis vectors to rapidly adapt the initial speech model to that of the user. The system further employs a confidence measuring technique whereby the system automatically bases its adaptation upon utterances recognized with high confidence, while ignoring utterances recognized with low confidence. In this way, the system automatically adapts to the user quite rapidly, increasing the recognizer's chance of having good recognition performance, without adapting to incorrect pronunciations. The system is thus useful with difficult speakers, such as children or foreign speakers.

Those who have used present day continuous speech recognition systems are acquainted with the time consuming and rigorous process by which the speech model of the recognizer is adapted to the individual user's speech. For most adult users who are already fluent in speaking the language, the adaptation process simply involves the discipline of providing sufficient examples of that user's speech so that the initially supplied speaker-independent speech model can be adapted into a speaker-dependent model for that speaker. The adaptation process can be supervised, in which the user speaks words, phrases or sentences that are known in advance by the recognition system. Alternatively, the adaptation process can be unsupervised, in which case the user speaks into the system without the system having a priori knowledge of the speech content.

Adapting the speech recognition system to speech provided by children or foreign speakers who do not fluently speak the language is considerably more difficult. Speech recognition systems have great difficulty correctly processing and recognizing the speech of children and foreign speakers, in part because the speech models of present day recognizers are trained upon a corpus of native-speaking adult speakers. There is simply very little data available for children and foreign speakers.

in addition to poor recognition, speech recognizers have difficulty with children and foreign speakers because interaction with these types of users is very difficult. Children between the ages of four and seven generally have a difficult time concentrating on the task of training the recognizer. Children become distracted easily and cannot be relied upon to follow the adaptation procedures correctly. Indeed, this difficulty in obtaining speech data from children is one reason why the corpus of speech data from children is so small.

Foreign speakers present a similar problem. Although adult foreign speakers are able to concentrate on the adaptation task, like children, they may be unable to read training scripts used for adaptation, and they may mispronounce so many words that the adapted speech model will fail to properly recognize subsequent speech.

The present invention addresses the foregoing problems by providing a speech recognition apparatus that will adapt the initial speech model using a highly effective and rapid adaptation system that will automatically assess the quality or accuracy of the user's pronunciation, using only the high confidence utterances for adaptation. The adaptation system uses a priori knowledge about the class of speakers for which the application is intended to adapt to the user's voice with only a very limited amount of adaptation data.

More specifically, the adaptation system is based on a speaker space representation of the class of speakers. A plurality of training speakers is used to generate speech models that are then dimensionally reduced to generate a set of basis vectors that define an eigenspace. During the adaptation process, speech units uttered by the user are used to train the adapted speech model, while the space spanned by the basis vectors is used to constrain the adapted speech model to lie within the eigenspace. As more fully described below, we have discovered that this eigenvoice technique of encoding a priori knowledge about the target user population achieves remarkably rapid adaptation, even when very little adaptation data is provided. The system is able to begin performing adaptation almost as quickly as the user begins speaking. Once the speaker has provided an utterance that the confidence measurement system admits as reliable, the speech model associated with that utterance may be placed or projected into the eigenspace, thereby establishing an adapted speech model that is constrained to the class of speakers for which the application is intended.

The speech recognition apparatus has many uses and makes possible a number of interesting applications that have heretofore been difficult to achieve. One example is the computer based teaching system that guides children or foreign speakers in the correct pronunciation of new words within the language. In a system suitable for children, a simple supervised adaptation session can commence by prompting the child simply to state his or her name. The system may have a priori knowledge of the child's name by spelled name keyboard entry.

In a language teaching system the confidence measure can also be used to query the user on words that are not confidently recognized. The teaching system may include a speech playback system containing speech data representing prerecorded speech. This data can supply proper pronunciation of words as part of the query, thereby seeking user verification of a potentially misunderstood word, while at the same time pronouncing the word correctly for the user to hear.

While the speech recognition apparatus of the invention is highly useful in language teaching systems, the rapid adaptation system coupled with the confidence measure renders the recognizer quite useful in other applications where adaptation is difficult. These applications include telephone call routing and speech-enabled marketing systems where rapid and reliable speaker adaptation is needed almost from the instant the speaker begins speaking.

For a more complete understanding of the invention, its objects and advantages, refer to the following specification and to the accompanying drawings.

DESCRIPTION OF THE PREFERRED EMBODIMENT

Figure 1:
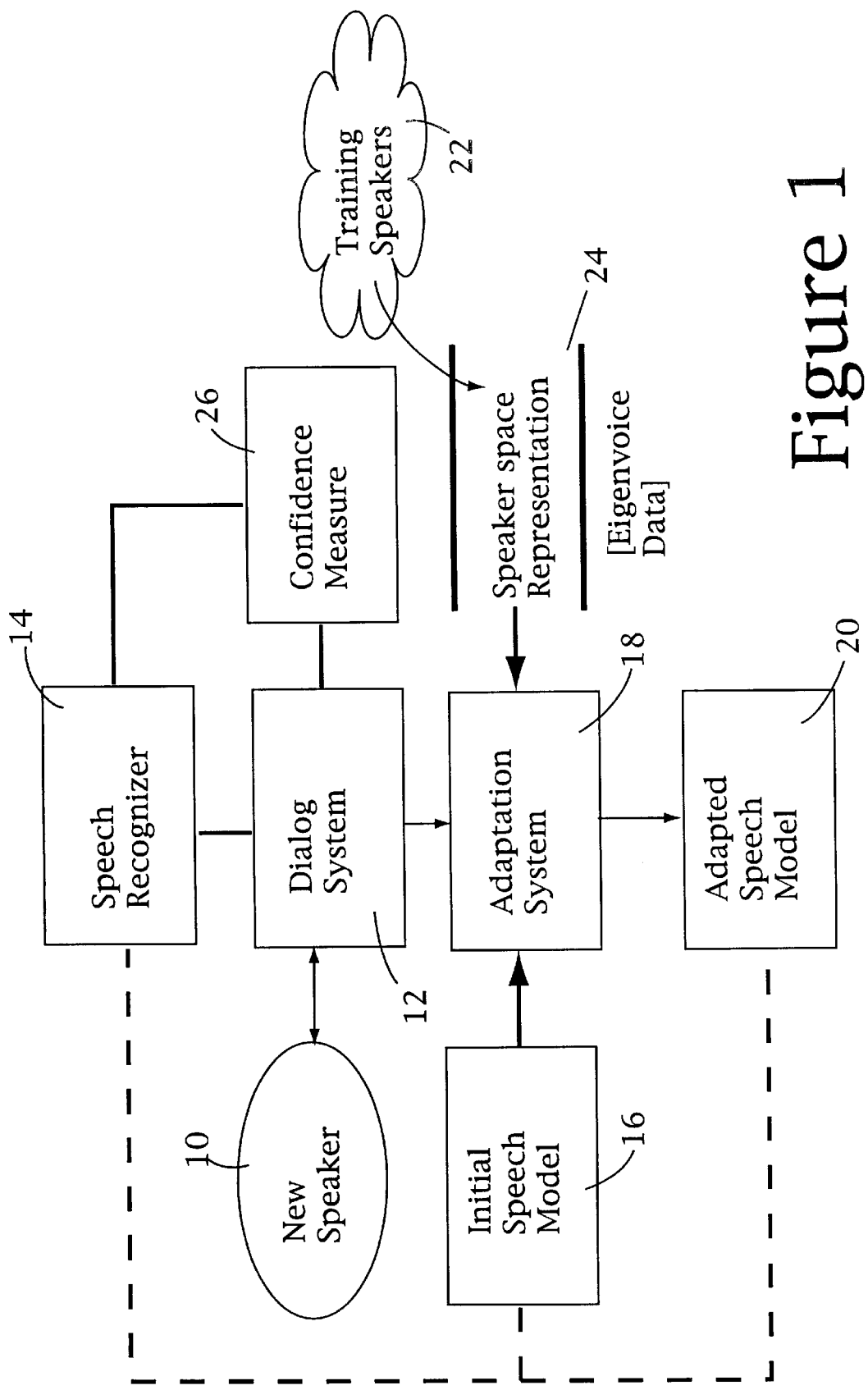
FIG. 1 is a block diagram of the speech recognition apparatus.

The speech recognition apparatus of the invention is illustrated in its presently preferred form in FIG. 1. The system rapidly adapts as a new speaker 10 interacts with the recognition apparatus through the dialogue system 12. The dialogue system 12 can be a simple interface to speech recognizer 14, or it may include the interactive capability to prompt the new speaker for input, or to provide the speaker with instruction on how to correctly pronounce words in the language.

The speech recognizer 14 operates in conjunction with one or more speech models that represent all sound units recognized by the system. In the illustrated embodiment, an initial speech model 16 is associated with speech recognizer 14 to define the speaker independent model with which the new speaker will interact during adaptation. The speech recognition apparatus includes an adaptation system 18 that adapts the initial speech model 16, based on selected, high-confidence, utterances from the new speaker. The adaptation system thus adapts the initial speech model to create an adapted speech model 20 that is associated with the recognizer 14. The adapted speech model can be stored apart from the initial speech model, leaving the initial speech model intact for subsequent use by different new speakers. Alternatively, the initial speech model and adapted speech model can be merged into a single model, if desired.

The adaptation system 18 performs high speed adaptation thanks to it's a priori knowledge about the class of new speakers. This knowledge is represented as a set of eigenspace basis vectors that we call eigenvoices. The eigenvoices are derived from a plurality of training speakers 22 and represent speaker space. The preferred embodiment represents speaker space as eigenvoice data 24. The adaptation system thus includes an eigenvoice data store 24 containing and eigenspace data structure that represents the plurality of training speakers as a set of dimensionally reduced models. As will be more fully described below, the training speakers 22 provide speech upon which models are trained, and those models are then dimensionally reduced to generate a set of basis vectors that define the eigenspace. In essence, the eigenvoice data store represents the entire collection of training speakers. The adaptation system uses the basis vectors stored within data store 24 to constrain the adapted speech model 20, so that it lies within the predefined eigenspace.

One important advantage of the eigenvoice adaptation system is speed. The adaptation process can commence based upon a single utterance. It is not necessary for the new speaker to provide examples of each sound unit within the speech model before adaptation can commence. This advantage results from the eigenvoice representation, because a single utterance may be used to generate a set of vectors that may then be placed or projected onto the eigenspace. Although the adapted speech model 20 typically tends to improve over time, as the system is used, the very first adapted speech model generated by the system nevertheless tends to be remarkably accurate.

When adapting the speech of difficult speakers, such as children or foreign speakers, some utterances may be so far from the expected that they must be discarded. For example, if the dialogue system 12 prompts the new speaker to say the word "cat," but the speaker says the word "elephant," that utterance should not be used to train the speech model associated with the word "cat". While this extreme example has been provided to illustrate the point, we have found that young children have a great deal of difficulty concentrating on lengthy prompt-reply sessions and may often enter spurious utterances into the system. Young children also tend to be less aware of complying with microphone placement instructions. They do not always speak into the microphone at a predetermined distance. Background noise generated by the television or by other children can get picked up by the microphone and render certain utterances unrecognizable.

To address this problem, the speech recognition apparatus uses a confidence measurement system 26 that is coupled to the recognizer 14 and provides a quantitative measure of how reliable each utterance is. The confidence measurement system mediates the adaptation process, screening out utterances that are not reliable enough for use by the adaptation system 18. Although there are a number of different techniques for measuring confidence and employing these measurements in the adaptation system, the presently preferred embodiment uses a likelihood score ratio that compares the likelihood score associated with correct recognition with the mean or average of the likelihood scores associated with incorrect recognition. Further details of this likelihood ratio are provided in connection with FIG. 2 that will be discussed next.

If desired, the confidence measurement system may be coupled to the dialogue system as one mechanism for mediating the adaptation process. As the new speaker supplies utterances to the dialogue system, the speech recognizer 14 performs speech recognition and the confidence measurement system 26 assigns a confidence measure to the results of that recognition. Recognized utterances with a sufficiently high confidence measure (those above a predetermined confidence measure threshold) are passed by the dialogue system 12 to adaptation system 18. Utterances having a low confidence measure are not passed to the adaptation system.

Although utterances with low confidence can be simply discarded, the dialogue system 12 may exploit the confidence measure to prompt the new speaker in a way that: (a) queries the new speaker to repeat the utterance and (b) teaches the new speaker the proper pronunciation for the word the speech recognizer thinks the speaker has uttered. Consider the following example:

System: "What color is the giraffe?"
Child: (Answer unintelligible—low confidence, resembling "brown")
System: "Did you say 'brown'?"
Child: "Yes."
System: Say, "the giraffe is brown."
Child: "The giraffe is brown."

In the preceding sequence, the child's initially unintelligible answer—interpreted as the word "brown"—was used in a subsequent series of prompts designed to teach the child the correct pronunciation.

Figure 2:
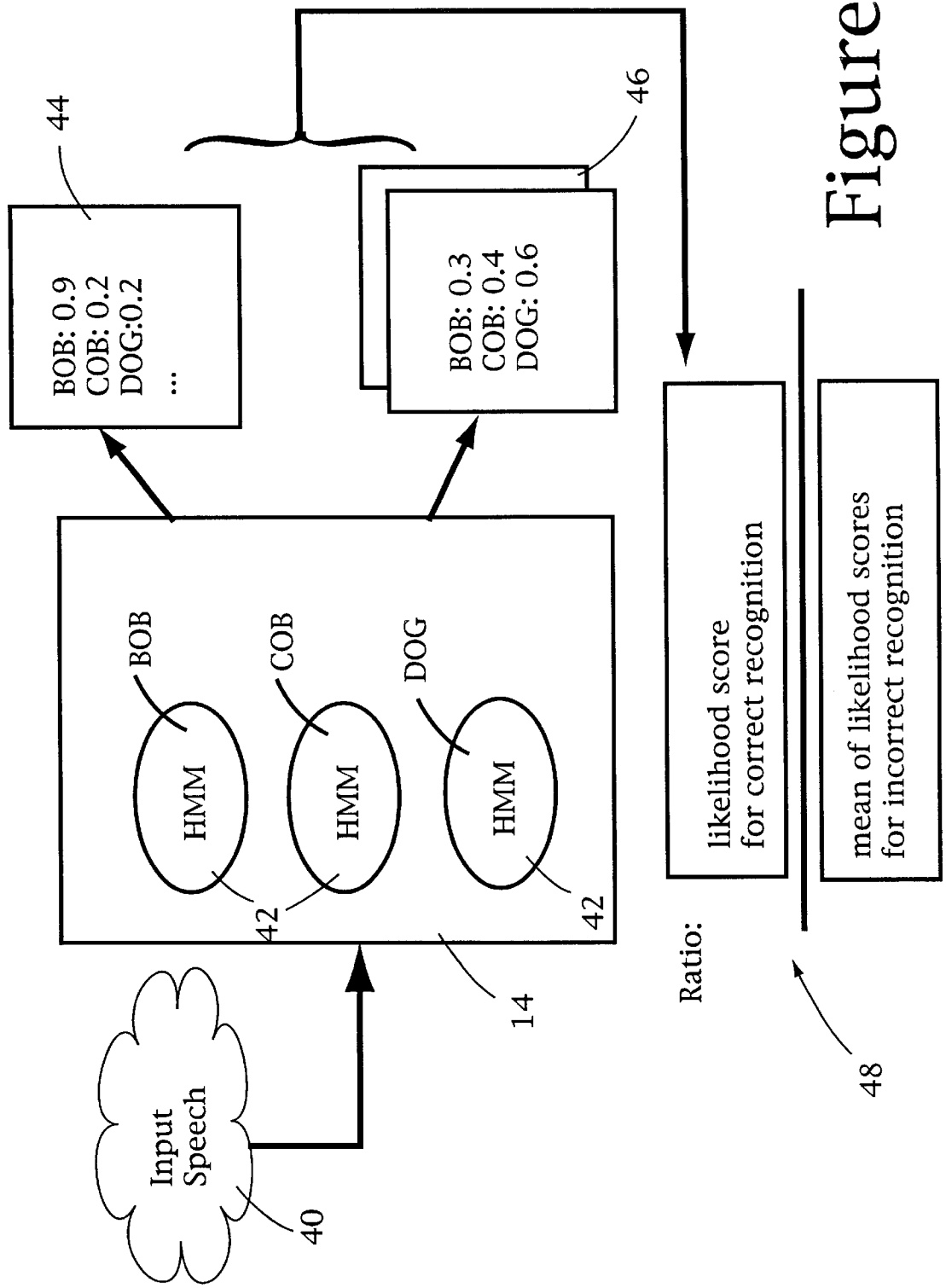
FIG. 2 is a block diagram illustrating how the confidence measure is generated using a likelihood score ratio.

The confidence measurement system 26 can take many forms. The presently preferred embodiment uses the likelihood scores generated by the speech recognizer in a way that normalizes the scores to yield a measurement system that is vocabulary independent. FIG. 2 illustrates a presently preferred embodiment of such a normalizing system. Input speech 40 is supplied to the speech recognizer 14 which has associated with it a plurality of speech models, in this case Hidden Markoff Models 42 (HMMs). Each HMM has been trained to represent a different sound unit. For illustration purposes, the HMMs shown in FIG. 2 each correspond to different words that the system will recognize. The techniques illustrated here are not limited to word-based models, as they are generally applicable to recognizers based on other sound units (e.g., full names, syllables, words, phrases, etc.).

In response to an input speech utterance 40, the recognizer assesses what is the likelihood that each of its models would generate the input utterance. The recognizer assigns or associates a recognition score with each model. Thus, if the input speech comprises the word "Bob", the "bob" model will generate a higher recognition score than the other models, "cob", "dog", and so forth. Illustrated at 44 are the recognition scores corresponding to the case where the utterance (Bob) is correctly recognized. Note that the recognition score (0.9) generated by the HMM model for Bob is higher than the recognition scores generated by the other models.

On the other hand, the input speech may be incorrectly recognized, because the utterance is mispronounced. The likelihood scores no longer identify the input utterance as the most likely, as illustrated at 46. In general, there may be numerous examples of incorrect recognition, each with a different set of likelihood scores. This has been illustrated at 46 as a plurality of "pages" each containing a different likelihood distribution.

The likelihood data illustrated at 44 and 46 thus represent two different classes. The first class corresponds to the case of correct recognition (44) and the second class corresponds to the case of incorrect recognition (46). A ratio of these two classes may be constructed as depicted at 48. The ratio comprises the likelihood score for correct recognition (as numerator) and the mean of likelihood scores for incorrect recognition (as denominator).

The ratio described in FIG. 2 can be computed as a logarithm, in which case the log likelihood difference becomes a representation of whether the utterance has a high confidence or low confidence measure.

$$V_j^{(1)}(O_j; s_j) = \log[L(O_j|s_j)] - \log\left[\frac{1}{K-1}\sum_{k=1, k\neq j} \exp(\gamma \log[L(O_j|s_k)])\right]^{1/\gamma}$$

Where:
  $O_j$ is a speech observation associated with model $s_j$;
  $s_j$ is an HMM model;
  $L(O_j|s_j)$ is the likelihood of observation $O_j$ given HMM model $s_j$;
  $\gamma$ is a tuning factor.

The above equation demonstrates that when the first term dominates (when the log likelihood difference is positive) a high confidence measure results. When the second term dominates (the log likelihood difference is negative) a low confidence measure results. Thus, the confidence measurement system 26 (FIG. 1) can readily determine whether a given utterance should or should not be used by the adaptation system, simply by computing the log likelihood difference according to the above equation and testing whether that difference is positive or negative or comparing it to a predetermined threshold.

The confidence measure based on the log likelihood difference can be fine tuned by adjusting the value of the constant $\gamma$. If the value is set very large, the sum in the second term is dominated by the largest likelihood value. This implies that only the contribution of the first competing word model to that of the correct recognition case is considered. As $\gamma$ is made smaller, the contribution of the other likelihood's becomes more significant. In practice, $\gamma$ should be set to a value that results in an overall good verification performance for all words.

Constructing the Eigenvoice Space

Figure 3:
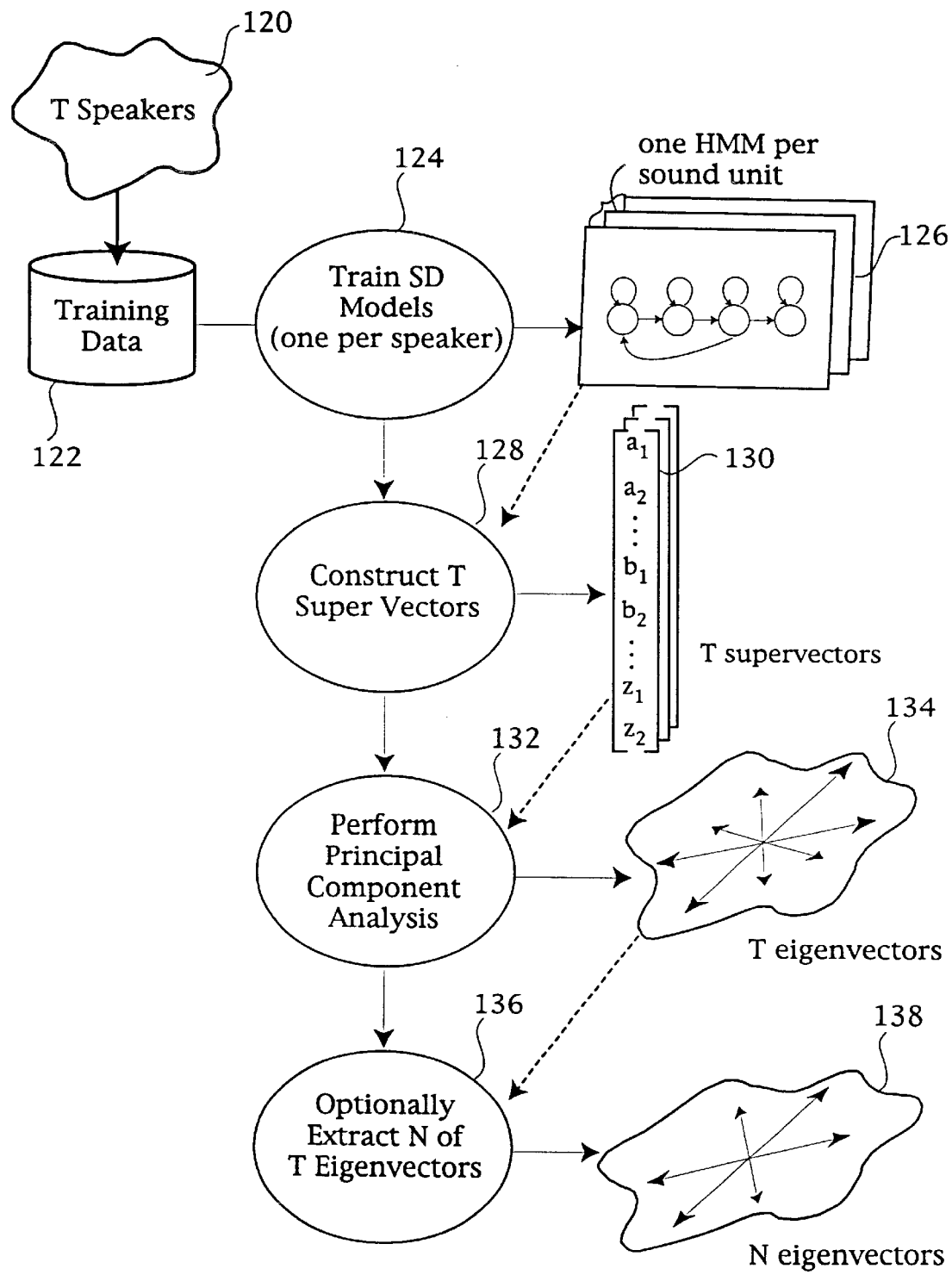
FIG. 3 is a data flow diagram illustrating how to construct an eigenspace from a plurality of training speakers.

The process for constructing an eigenspace to represent a plurality of training speakers is illustrated in FIG. 3. The illustration assumes a number T of training speakers 120 provide a corpus of training data 122 upon which the eigenspace will be constructed. Preferably, a reasonably large number of speakers (on the order of 100 to 200) provide the training data. These training data are then used to train a speaker dependent (SD) model as illustrated at 124. One model per speaker is constructed at step 124, with each model representing the entire lexicon that is to be understood by the recognition system. Each model can be a set of HMMs, one HMM for each sound unit. This is illustrated in FIG. 3 at 126.

After all training data from T speakers have been used to train the respective speaker dependent models, a set of T supervectors is constructed at 128. Thus there will be one supervector 130 for each of the T speakers. The supervector for each speaker comprises an ordered list of parameters (typically floating point numbers) corresponding to at least a portion of the parameters of the Hidden Markov Models for that speaker. Parameters corresponding to each sound unit are included in the supervector for a given speaker. The parameters may be organized in any convenient order. The order is not critical; however, once an order is adopted it must be followed for all T speakers.

The ordered Hidden Markov Model parameters are then concatenated to form the supervector. The choice of which HMM parameters to include in the supervector may depend on the available processing power. We have found that constructing supervectors from the Gaussian means gives good results. If greater processing power is available, the supervectors may also include other HMM parameters, such as the transition probabilities or the Covariance matrix parameters. Naturally, if the Hidden Markov Models generate discrete outputs (as opposed to probability densities) then these output values may be used to comprise the supervector.

After supervectors have been constructed for each of the training speakers, dimensionality reduction is performed at step 132. In general, eigenvoice adaptation involves an advantageous dimensionality reduction that can greatly improve the speed and efficiency at which speaker and environment adaptation is performed. Dimensionality reduction refers to a mapping of high-dimensional space onto low-dimensional space. A variety of different techniques may be used to effect dimensionality reduction. These include Principal Component Analysis (PCA), Linear Discriminant Analysis (LDA), Factor Analysis (FA), Singular Value Decomposition (SVD) and other transformations that apply reduction criteria based on variance. In the present example illustrated here, principal component analysis has been used.

Principal component analysis upon T supervectors yields T eigenvectors, as at 134. Thus, if 120 training speakers have been used the system will generate 120 eigenvectors. These eigenvectors define what we call eigenvoice space or eigenspace.

The eigenvectors that make up the eigenvoice space are uncorrelated; they each represent a different dimension across which different speakers may be differentiated. Each supervector in the original training set can be represented as a linear combination of these eigenvectors. The eigenvectors are ordered by their importance in modeling the data: the first eigenvector is more important than the second, which is more important than the third, and so on. Our experiments with this technique thus far show that the first eigenvector appears to correspond to a male-female dimension.

Although a maximum of T eigenvectors is produced at step 132, in practice, it is possible to discard several of these eigenvectors, keeping only the first N eigenvectors. Thus at step 136 we optionally extract N of the T eigenvectors to comprise a reduced parameter eigenspace at 138. The higher order eigenvectors can be discarded because they typically contain less important information with which to discriminate among speakers. Reducing the eigenvoice space to fewer than the total number of training speakers provides an inherent data compression that can be helpful when constructing practical systems with limited memory and processor resources.

Performing the Adaptation

Figure 4:
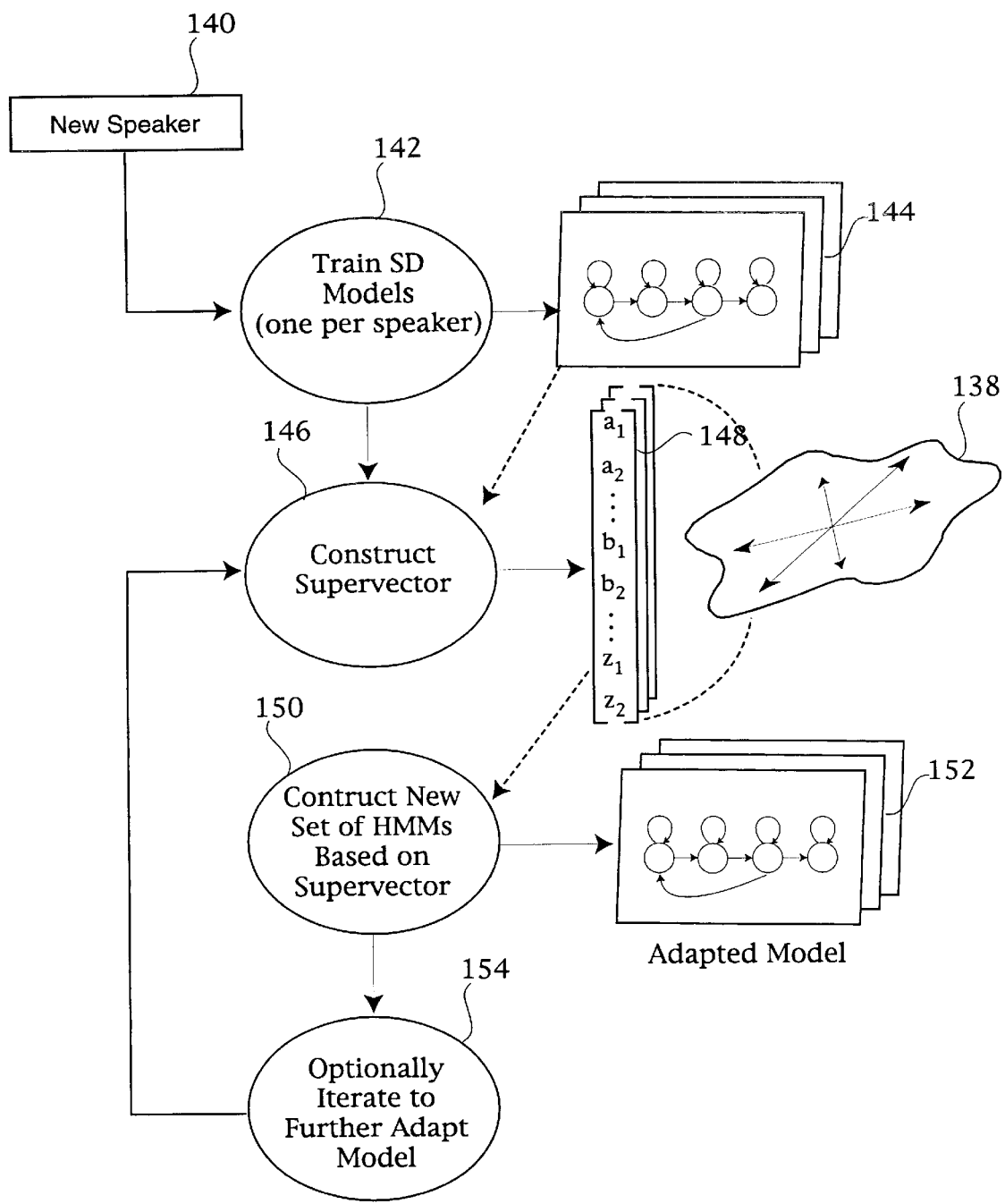
FIG. 4 is a data flow diagram illustrating how an adapted model is constructed using the eigenvoices in accordance with the invention.

Once the eigenvoice space has been constructed, speaker adaptation or environment adaptation can be readily accomplished. While constructing the eigenspace is somewhat computationally intensive, and is typically conducted offline, adaptation is a comparatively simple computational operation that can be performed while the new speaker is using the system. Referring to FIG. 4, speech from new speaker 140 is used at step 142 to train a speaker dependent model to construct a set of HMMs 144 (one for each sound unit). The speaker dependent model can be trained in either a supervised mode, where the training system knows the content of the training speech in advance, or in an unsupervised mode, where the speech recognition system uses a speaker independent model to determine the content of the adaptation speech.

The speaker dependent model trained on this new speaker will usually be very inadequate for recognition, at least at first. However, the model may nevertheless be used to construct a supervector. The supervector is constructed at step 146 such that the supervector (supervector 148) is constrained to fall within the eigenvoice space 138 previously created from the training speakers. Supervector 148 is constructed with the imposed constraint that the HMM model used for recognition must be a linear combination of the eigenvoices comprising eigenvoice space 138.

The speaker dependent model 144 serves to estimate the linear combination of coefficients that will comprise the adapted model for that new speaker. Thus in step 150 a new set of HMMs is constructed based on supervector 148 to generate the adapted model 152. If desired, an optional iterative process may be performed at 154 to construct a new supervector from the adapted model 152 and thereafter to construct another set of HMMs from which a further adapted model may be constructed.

The constructing of supervector 148 may be accomplished through a computationally simple projection operation or the like, whereby the parameters from the speaker dependent model 144 are projected or otherwise transformed or "placed" into eigenvoice space 138. The precise technique for placing the parameters into eigenspace may depend upon the available computational resources. If resources are limited a simple projection operation may be used; if greater resources are available an optimizing operation may be used to find the point in eigenspace that represents the highest probability or best match with the adaptation data. In this way, the speaker dependent model 144, trained on adaptation data, is combined with the eigenvoice vectors to obtain a reasonable estimate of the speaker dependent model for the new speaker (the adapted model 152) through a computationally inexpensive operation.

When the new set of HMMs is constructed at step 150, any parameters that were not used in constructing the supervector 148 (if only Gaussian mean vectors were used for example) then the other HMM parameters may be obtained from a previously constructed speaker independent model.

In some instances the adaptation data may have missing sound units (certain sound units were not spoken by the new speaker). Thus the speaker dependent model 144 may not be complete. However, even with missing sound units the eigenvoice adaptation technique will work. At first blush this may seem surprising, however, recall that the eigenvectors are uncorrelated vectors, with the first eigenvector being more important than the second, and so forth. As a result of this, it is possible to derive a significant amount of useful information from the adaptation data, even if some of it is missing.

One way to handle missing sound units is to replace the missing sound unit HMM parameters with corresponding values obtained from a speaker independent model. This is a computationally inexpensive approach, but has the drawback that the adapted model may be quite similar to the speaker independent model when only small amounts of adaptation data are available.

Another approach is to find the point Y in the eigenspace that maximizes the likelihood of the adaptation data, given the adapted model derived from Y. This maximum-likelihood estimator requires that we solve a different set of linear equations during runtime.

From the foregoing it will be recognized that the techniques employed by the illustrated adaptation system can be employed in a variety of different speech recognition systems and language teaching systems. Moreover, while the eigenvoice techniques described herein are presently preferred, other techniques may be used to represent speaker space in the adaptation system.

Accordingly, while the invention has been described in its presently preferred embodiments, it will be appreciated that the invention is capable of modification and change without departing from the spirit of the invention as set forth in the appended claims.

What is claimed is:

1. A speech recognition apparatus that adapts an initial speech model based on input speech from the user, comprising:

a speech model that represents speech as a plurality of speech unit models associated with a plurality of speech units;

a speech recognizer that processes input speech from a user using said speech model to recognize uttered speech units within said input speech;

a confidence measurement system associated with said speech recognizer for associating a confidence measure with each of said uttered speech units;

an adaptation system having data store containing information reflecting a priori knowledge about a speaker space, said adaptation system being operative to select uttered speech units that exceed a predetermined confidence measure and to use said selected uttered speech units and said information reflecting a priori knowledge to adapt said speech model; and wherein said adaptation system includes a data store containing a set of eigenspace basis vectors representing a plurality of training speakers and wherein said adaptation system uses said selected uttered speech units to train an adapted speech model while using said basis vectors to constrain said adapted speech model such that said adapted speech model lies within said eigenspace.

2. The speech recognition apparatus of claim 1 further comprising a dialogue system coupled to said confidence measurement system for selecting at least a portion of said uttered speech units and for prompting said user based on said selected portion of said uttered speech units.

3. The speech recognition apparatus of claim 2 further comprising speech playback system containing speech data representing prerecorded speech, said playback system coupled with said dialogue system for confirming said portion of said uttered speech units to said user by using said speech data to provide an audible playback corresponding to said portion of said uttered speech units.

4. A speech recognition apparatus that adapts an initial speech model based on input speech from the user, comprising:

a speech model that represents speech as a plurality of speech unit models associated with a plurality of speech units;

a speech recognizer that processes input speech from a user using said speech model to recognize uttered speech units within said input speech;

a confidence measurement system associated with said speech recognizer for associating a confidence measure with each of said uttered speech units;

an adaptation system having data store containing information reflecting a priori knowledge about a speaker space, said adaptation system being operative to select uttered speech units that exceed a predetermined confidence measure and to use said selected uttered speech units and said information reflecting a priori knowledge to adapt said speech model;

wherein said adaptation system includes a data store containing an eigenspace data structure that represents a plurality of training speakers as a set of models for said training speakers that has been dimensionally reduced to generate a set of basis vectors that define said eigenspace; and wherein said adaptation system uses said selected uttered speech units to train an adapted speech model while using said basis vectors to constrain said adapted speech model such that said adapted speech model lies within said eigenspace.

5. The speech recognition apparatus of claim 4 further comprising a dialogue system coupled to said confidence measurement system for selecting at least a portion of said uttered speech units and for prompting said user based on said selected portion of said uttered speech units.

6. The speech recognition apparatus of claim 5 further comprising speech playback system containing speech data representing prerecorded speech, said playback system coupled with said dialogue system for confirming said portion of said uttered speech units to said user by using said speech data to provide an audible playback corresponding to said portion of said uttered speech units.

* * * * *